(12) United States Patent
Atsumi et al.

(10) Patent No.: US 6,961,205 B2
(45) Date of Patent: Nov. 1, 2005

(54) MAGNETIC DISK APPARATUS

(75) Inventors: Takenori Atsumi, Ushiku (JP); Hidehiko Numasato, Odawara (JP); Jiro Abe, Sagamihara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 90 days.

(21) Appl. No.: 10/680,315

(22) Filed: Oct. 8, 2003

(65) Prior Publication Data
US 2004/0240102 A1    Dec. 2, 2004

(30) Foreign Application Priority Data
May 30, 2003   (JP) .............................. 2003-154365

(51) Int. Cl.[7] ............................................. G11B 5/596
(52) U.S. Cl. ................................ 360/78.06; 360/78.09
(58) Field of Search ..................... 360/78.06, 78.04, 360/78.09, 75, 77.02, 78.07; 318/561

(56) References Cited

U.S. PATENT DOCUMENTS

| | | | | |
|---|---|---|---|---|
| 5,343,131 A | * | 8/1994 | Baumann | .................... 318/561 |
| 5,345,348 A | * | 9/1994 | Suzuki | .................... 360/78.07 |
| 5,936,792 A | * | 8/1999 | Kobayashi et al. | ....... 360/78.07 |
| 6,819,522 B2 | * | 11/2004 | Atsumi et al. | ........... 360/78.06 |
| 6,831,809 B2 | * | 12/2004 | Kagami et al. | .......... 360/78.09 |

FOREIGN PATENT DOCUMENTS

JP    A-9-73618    *    3/1997

* cited by examiner

*Primary Examiner*—Andrew L. Sniezek
(74) *Attorney, Agent, or Firm*—Antonelli, Terry, Stout and Kraus, LLP.

(57) ABSTRACT

A seek controller corresponds to a velocity control system which produces a target value based upon a target track, a present position, and a remaining distance from a commencement of a seek operation up to a time instant when a sign of an operating amount is changed; and the seek controller corresponds to a Two Degree of Freedom control system which sets an waveform by a function of time as a target value after the time instant when the sign of the operating amount is changed. The hard disk drives applies a velocity control system based upon a deviation of head positions as to a VCM voltage saturation and a uniform velocity mode, and also, applies a Two Degree of Freedom control system with employment of a function of time having a smooth locus in a decelerated velocity mode so as to suppress residual vibrations.

10 Claims, 12 Drawing Sheets

MAGNETIC DISK APPARATUS

BACKGROUND OF THE INVENTION

The present invention generally relates to a magnetic disk apparatus. More specifically, the present invention is directed to a seek control means for moving a magnetic head to a target position.

In a hard disk drives functioning as an external storage apparatus of a computer, a magnetic head is transported to a target track on a rotated magnetic disk so as to read/write data with respect to the target track.

Generally speaking, a magnetic head positioning control system contains a following control system, a seek control system, and a settling control system (refer to, for example, Japanese Laid-open Patent Application No. HEI-9-73618). In the following control system, a magnetic head is continuously followed to the same track in order to read/write data with respect to the same track. The seek control system moves the magnetic head up to a target track where data is present. The settling control system couples the seek control system to the following control system in the vicinity of the target track.

In the seek control system, when a move distance is longer than, or equal to a predetermined distance, there are some cases that a voltage applied to a voice coil motor "VCM" is saturated in order that a maximum acceleration capability of this voice coil motor VCM is derived during accelerating operation. In an actual system, since there is an upper limit velocity in move velocitys of a head, the head must be moved in uniform motion at a maximum velocity in such a case that a move velocity of the head is reached to the upper limit velocity.

With respect to such a seek control system, a velocity control system is employed. This velocity control system feeds back a deference between a target velocity, which is determined by remaining distance (a difference between a target track and a present position), and a head velocity, which are predicted from head position signals.

In this velocity control system, the VCM voltage during accelerating operation can be saturated and the movement at a constant velocity can be realized.

On the other hand, in a relatively short move distance, the VCM voltage is not saturated during the accelerating operation, and also, the move velocity does not exceed the upper limit of the move velocity, so that the Two Degree of Freedom control system is employed which uses the smooth acceleration waveform by the function of time.

This Two Degree of Freedom control system can suppress vibrations which are produced during the seek operation, and can use the position feedback system having the high error compression characteristic.

In the velocity control system for producing the target value based upon the remaining distance, since the jerk of the control input is large, the vibrations are readily produced in the mechanism system, and the error compression characteristic thereof is low, as compared with the position control system. As a result, undesired sound may occur in the seek operation, and vibrations are readily produced in the mechanism system during settling operation.

On the other hand, the Two Degree of Freedom control system by the function of time cannot avoid that when the VCM voltage saturation occurs, the performance thereof is deteriorated due to the wind-up phenomenon, and also cannot manage the limitation of the maximum velocity. As a result, this Two Degree of Freedom control system can be hardly applied to the seek system in which the head is moved over the long distance.

With respect to such a problem, in the patent publication 1, such a seek control system is disclosed in which the feedforward system corresponds to the VCM voltage saturation and the uniform velocity mode as the velocity control system, and the feedback system is employed as the position control system.

In Japanese Laid-open Patent Application No.HEI-9-73618, since the feedback control system is the position control system, the high disturbance compression characteristic may be expected. However, since the feedforward control system is equal to the velocity control system for producing the target value based upon the remaining distance, this feedforward control system can hardly suppress the mechanism system vibrations.

An object of the present invention is to provide a hard disk drives provided with a seek control means containing a seek control system capable of managing also a VCM voltage saturation and a uniform velocity mode during seek operation, which produces low vibrations.

BRIEF SUMMARY OF THE INVENTION

To achieve the above-described object, the present invention provides such a hard disk drives comprising: seek control means for moving a magnetic head which reads/writes information of a magnetic recording medium to a target position, in which the seek control means corresponds to a velocity control system which produces a target value based upon a target track, a present position, and a remaining distance from a commencement of a seek operation up to a time instant when a sign of an operating amount is changed; and the seek control means corresponds to a Two Degree of Freedom control system which sets an waveform by a function of time as a target value after the time instant when the sign of the operating amount is changed.

Also, the present invention provides such a hard disk drives comprising: seek control means for moving a magnetic head which reads/writes information of a magnetic recording medium to a target position, in which the seek control means is comprised of: a velocity control system in which an operating amount is calculated based upon a deviation between a target track and a present position of the magnetic head; a Two Degree of Freedom control system in which an operating amount is calculated based upon time; and switching means for switching the velocity control system into the Two Degree of Freedom control system at a time instant when a sign of the operating amount is changed.

Further, the present invention provides such a hard disk drives comprising: seek control means for moving a magnetic head which reads/writes information of a magnetic recording medium to a target position, in which the seek control means is comprised of: a velocity control system in which an operating amount is calculated based upon a deviation between a target track and a present position of the magnetic head; a Two Degree of Freedom control system in which an operating amount is calculated based upon time; and switching means for switching the velocity control system into the Two Degree of Freedom control system at a time instant when a sign of the operating amount becomes zero.

The seek operation of the magnetic head includes an accelerated velocity mode, a uniform velocity mode in which acceleration becomes substantially zero, and a decelerated velocity mode; and a time historical response of acceleration during decelerating operation within at least two move distances may be expressed by a polynomial of time.

The seek operation of the magnetic head includes an accelerated velocity mode, a uniform velocity mode in which acceleration becomes substantially zero, and a decelerated velocity mode; and when a time instant of a point where the decelerating operation is commenced is assumed as "T1" and a time instant of an median between the time instant "T1" and an end of the seek operation is assumed as "T2", a time historical response of acceleration within a section defined from the time instant "T1" to the time instant "T2" may be approximately expressed by a polynomial of time which contains both an one-time integrated value of acceleration from the commencement of the seek operation up to the time instant "T1", and a two-time integrated value of the acceleration from the commencement of the seek operation up to the time instant "T1" as an initial value.

A control amount of the decelerated velocity mode corresponds to either a head position or a head velocity.

To achieve the above-explained object, the present invention provides such a hard disk drives comprising: a magnetic recording medium; a magnetic head for reading/writing information of the magnetic recording medium; a voice coil motor VCM for driving the magnetic head; and seek control means for moving the magnetic head to a target position; in which a seek operation of the magnetic head includes an accelerated velocity mode and a decelerated velocity mode; the seek control means corresponds to a velocity feedback control system in the accelerated velocity mode, and also, corresponds to a Two Degree of Freedom control system for setting a magnetic head position by a function of time as a target value in the decelerated velocity mode; the velocity feedback control system is comprised of: a target velocity generator for setting a target velocity based upon a deviation between a present head position "P" and a target track "Ref"; a velocity predicting device for forming a predicted velocity based upon a head position signal "P"; a velocity control device for acquiring a VCM control signal based upon a deviation between the target velocity and the predicted velocity; a position control device for capturing a positional error equal to a deviation between a model position for a positional feedback purpose and the head position signal "P", and for outputting a positional feedback input used to compress the positional error; a rigid-body position model, a rigid-body velocity model, and a resonance model of the magnetic head, which capture a deviation between the VCM control signal and the positional feedback input; and also, a delay model for capturing a summation between an output of the rigid-body position model and an output of the resonance model, and for outputting the model position for positional feedback purpose; and the Two Degree of Freedom control system is comprised of: an acceleration waveform for outputting a feedforward input based upon an initial value when the mode is switched from the accelerated velocity mode; a position waveform based upon the initial value; a resonance model for capturing the feedforward input; a delay model for capturing a summation between an output of a position waveform "Pt" and an output of the resonance model; a position control device for capturing a positional error equal to a deviation between an output of the delay model and a head position signal "P"; and adding means for setting a summation between the feedforward input and an output of the position control device as the VCM control signal.

Also, the present invention provides such a hard disk drives comprising: a magnetic recording medium; a magnetic head for reading/writing information of the magnetic recording medium; and seek control means for moving the magnetic head to a target position; in which a seek operation of the magnetic head includes an accelerated velocity mode and a decelerated velocity mode; the seek control means corresponds to a velocity feedback control system in the accelerated velocity mode, and also, corresponds to a Two Degree of Freedom control system for setting a magnetic head velocity as a target value in the decelerated velocity mode; the velocity feedback control system is comprised of: a target velocity generator for setting a target velocity based upon a deviation between a present head position "P" and a target track "Ref"; a velocity predicting device for forming a predicted velocity based upon a head position signal "P"; a velocity control device for acquiring a VCM control signal based upon a deviation between the target velocity and the predicted velocity; a position control device for capturing a positional error equal to a deviation between a model position for a positional feedback purpose and the head position signal "P", and for outputting a positional feedback input used to compress the positional error; a rigid-body position model, a rigid-body velocity model, and a resonance model of the magnetic head, which capture a deviation between the VCM control signal and the positional feedback input; and also, a delay model for capturing a summation between an output of the rigid-body position model and an output of the resonance model, and for outputting the model position for positional feedback purpose; and the Two Degree of Freedom control system is comprised of: an acceleration waveform for outputting a feedforward input based upon an initial value when the mode is switched from the accelerated velocity mode; a velocity waveform for outputting a velocity waveform based upon the initial value; a delay model for capturing an output of the acceleration waveform; a velocity predicting device for predicting a velocity based upon a head position signal "P"; adding means for calculating a velocity error based upon a deviation between an output of the delay model and an output of the velocity predicting device; a velocity control device for outputting a velocity feedback input based upon the velocity error; and adding means for adding the feedforward input to the velocity feedback input so as to obtain the VCM control signal.

In any of the above-described magnetic disk apparatus, in such a case that the seek operation of the magnetic head includes a uniform velocity mode in which acceleration becomes substantially zero between the accelerated velocity mode and the decelerated velocity mode, a velocity control system same as the accelerated velocity mode may be employed during the uniform velocity mode.

The seek operation of the present invention is sectioned in this order of the accelerated velocity mode, the uniform velocity mode, and the decelerated velocity mode. Among these velocity modes, the accelerated velocity mode causes the problem as to the VCM voltage saturation. Also, the uniform velocity mode is present only in such a case that the move velocity reaches the maximum velocity.

In the accelerated velocity mode, the interval of time until the seek terminal is short, the produced mechanism system vibrations give only a small influence to the settling system.

Similarly, since the acceleration becomes substantially zero in the uniform velocity mode, the produced mechanism system vibrations give only a small influence to the settling system.

On the other hand, in the decelerated velocity mode, both the voltage saturation and the velocity restriction do not cause the problem. However, the interval of time until the seek terminal is short, the produced mechanism system vibrations may readily cause the residual vibrations during the settling operation. As a consequence, a large influence is given to the settling time, as compared with the accelerated velocity mode and the uniform velocity mode.

In the seek control means of the present invention, the velocity control system for producing the target value based upon the deviation between the target track and the present position is applied in both the accelerated velocity mode in which the VCM voltage saturation occurs, and in the uniform velocity mode by the velocity restriction.

As to the calculation method of the target value, the target value is designed based upon a desirable relationship between the remaining distance and the move velocity with respect to the acceleration waveform which is employed in the decelerated velocity mode.

As a result, the relationship between the remaining distance and the velocity at the time instant when the decelerated mode is commenced can be maintained under ideal condition as an waveform initial value irrespective of such a condition as the move distance.

In the decelerated velocity mode, the Two Degree of Freedom control system in which the waveform by the function of time is employed as the target value is applied. An initial value used when the waveform is calculated is determined by giving both the position and the velocity when the decelerating operation is commenced, and also, the target deceleration time is determined in response to the remaining distance at the time instant when the decelerating operation is commenced.

As a result, a smooth acceleration waveform which can hardly induce resonance of the mechanism system can be realized.

In the case that both a relationship between the remaining distance and the move velocity, which are given to the velocity control systems in both the accelerated velocity mode and the uniform velocity mode. And also, another relationship between the remaining distance and the target deceleration time, which are employed during the decelerating operation, are designed in accordance with the waveform calculating formula. The formula is employed during the decelerating operation, both maximum acceleration and maximum jerk, which occur when the decelerating operation is carried out, can be set under optimum conditions.

Other objects, features and advantages of the invention will become apparent from the following description of the embodiments of the invention taken in conjunction with the accompanying drawings.

DETAILED DESCRIPTION OF THE INVENTION

Next, a description is made of various embodiment modes of a hard disk drives according to the present invention.

Figure 1:
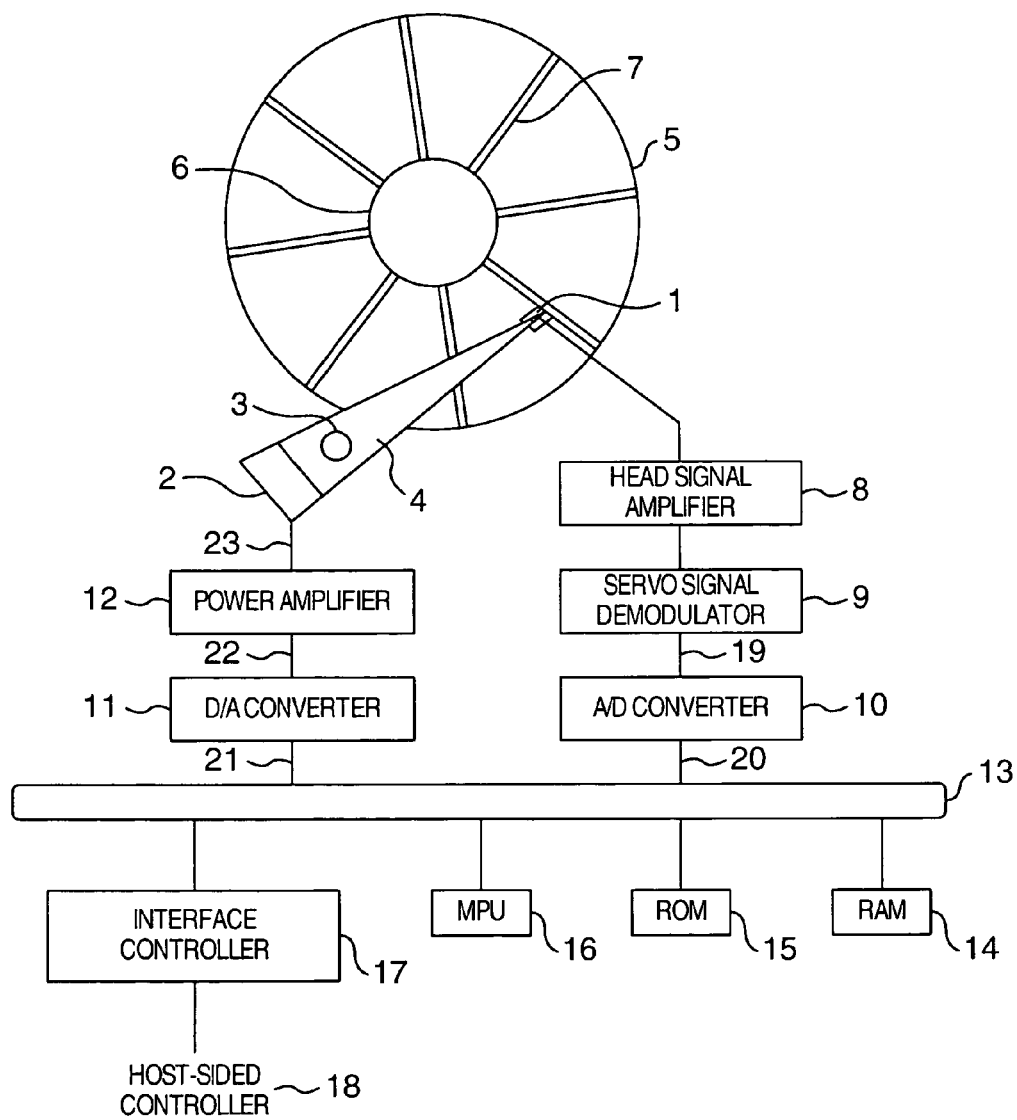
FIG. 1 is a block diagram for schematically indicating a system construction of a head positioning control system employed in a hard disk drives according to an embodiment 1 of the present invention.

FIG. 1 is a block diagram for schematically indicating a system construction of a head positioning control system employed in a hard disk drives according to an embodiment 1 of the present invention.

While a magnetic disk 5 corresponding to a recording medium is fixed on a spindle motor 6, this magnetic disk 5 is rotated in a determined rotation number. A pivot bearing 3 is provided along a side direction of the magnetic disk 5 held by the spindle motor 6 in such a manner that this pivot bearing 3 is located in parallel to a spindle motor shaft. A carriage 4 is fixed on the pivot bearing 3 in a swingable manner. A magnetic head 1 is fixed on a tip portion of the carriage 4. A voice coil motor "VCM" 2 generates power capable of moving the magnetic head 1.

The magnetic head 1 detects a position signal which has been recorded on a servo sector 7 formed on the magnetic disk 5 so as to grasp a present position of the magnetic head 1. The position signal detected by the magnetic head 1 is amplified by a head signal amplifier 8, and then, the amplified position signal is demodulated by a servo signal demodulator 9. A demodulated servo signal 19 is converted into a head position signal "P" by an A/D converter 10, and this head position signal "P" is captured via a bus 13 by an MPU 16.

A ROM 15 and a RAM 14 are connected to the MPU 16 via the bus 13. In this ROM 15, both various sorts of control programs involving the present invention, which are executed by the MPU 16, and also, parameters which are required for various sorts of control operations have been stored. The MPU 16 processes the head position signal P so as to produce a VCM control signal "D."

An interface controller 17 receives a command of a host-sided controller 18 to issue an access request of read/write operations with respect to the MPU 16. When a command (seek command) for requesting data read/write operations is issued, the MPU 16 executes a positioning method recorded in the ROM 15, and produces an optimum VCM control signal "D" in response to a distance defined from the present head position "P" up to a target track "Ref."

The produced VCM control signal D is converted into a power amplifier control signal 22 by a D/A converter 11, this power amplifier control signal 22 is converted into a current 23 by a power amplifier 12, and then, this current 23 is supplied to the voice coil motor (VCM) 2. The VCM 2 generates power capable of moving the magnetic head 1 so as to position the magnetic head 1 to a target position.

The present invention is related to a seek control means which produces a VCM control signal "D" based upon a difference between a present head position "P" and a target track "Ref."

Figure 2:
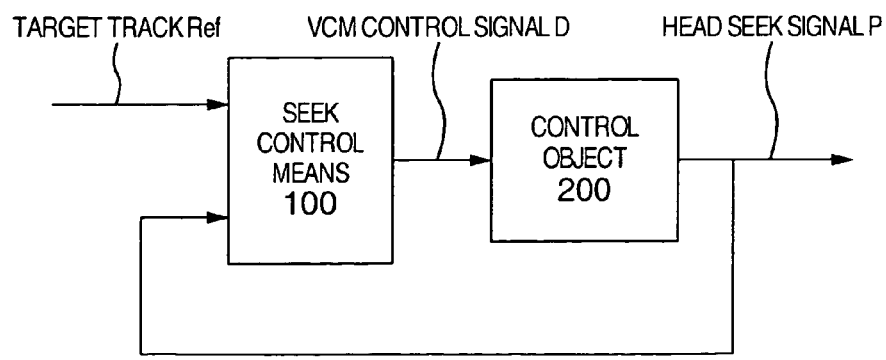
FIG. 2 is a block diagram for indicating a basic relationship between a control object and a seek control means of the hard disk drives according to the present invention.

FIG. 2 is a block diagram for showing a basic relationship between a control object 200 and a seek control means 100 of the hard disk drives according to the present invention. This basic relationship may be realized by executing the process operation by the MPU 16 as explained in FIG. 1.

In FIG. 2, the control object 200 implies such a transfer characteristic that the VCM control signal calculated by the MPU 16 is used as an input, a track position of the magnetic head 1 is digitally processed, and then, this digitally processed signal is outputted as a position signal "P."

The seek control means 100 inputs thereinto both a target track "Ref" where data is read/written and a position signal "P" indicative of a present head position, and calculates a VCM control signal "D" for positioning the magnetic head 1 based upon these input values, and then, applies this calculated VCM control signal D to the VCM 2.

It should be noted that in this embodiment 1, both a sampling period of positional information 20 and the input period of the VCM control signal D are assumed as "Ts" seconds, respectively.

The seek control means 100 owns two velocity modes as the seek control system, i.e., both an accelerated velocity/uniform velocity mode and a decelerated velocity mode, and switches these two modes in response to a condition (status) of the control system. The accelerated velocity/uniform velocity mode corresponds to such an operation mode defined from a commencement of a seek control until a head velocity is reached to a target velocity.

Figure 3:
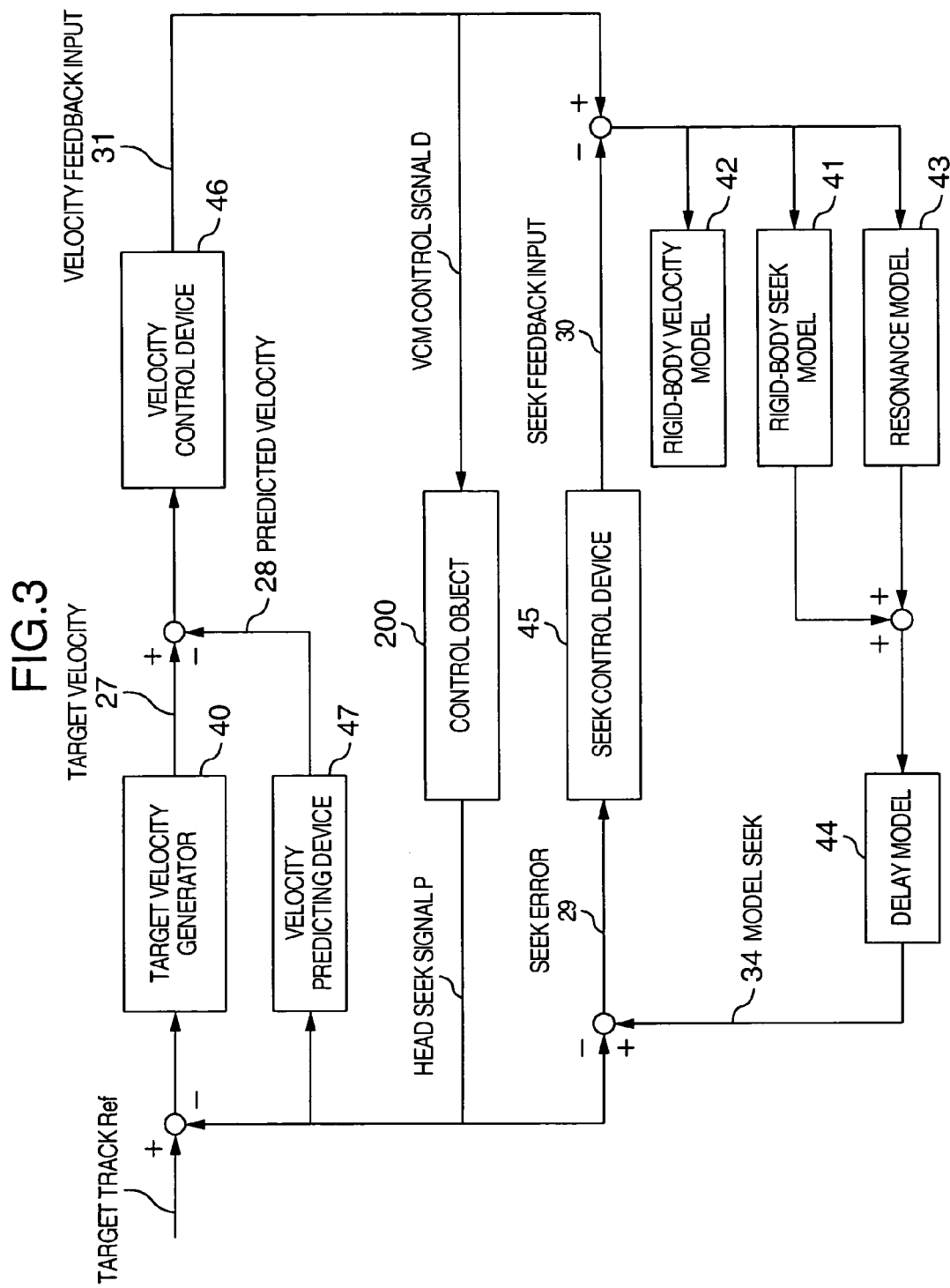
FIG. 3 is a block diagram for the seek control system of the accelerated velocity mode and the uniform velocity mode.

FIG. 3 is a block diagram for schematically indicating an arrangement of a control system according to an embodiment 1 in such a case that the seek control system is the accelerated velocity mode or the uniform velocity mode.

In the accelerated velocity/uniform velocity mode, a feedback control system corresponds to a velocity control system. The control amount of the velocity control system corresponds to a head velocity. However, since such a head velocity can be hardly monitored in a direct manner, a velocity predicting device 47 produces a predicted velocity 28 based upon a head position signal "P", and sets this predicted velocity 28 as the control amount of the velocity control system.

A target velocity generator 40 sets a target velocity 27 based upon a deviation between the present head position P and the target track "Ref."

A velocity control device 46 inputs thereinto a value obtained by subtracting the predicted velocity 28 from the target velocity 27 so as to obtain a velocity feedback input 31. The VCM control input D is assumed as this velocity feedback input 31.

In the accelerated velocity/uniform velocity mode of the embodiment 1, as an internal model, there are provided with a rigid-body position model 41, a rigid-body velocity model 42, a resonance model 43, and a delay model 44. It should be understood that in such a case that an influence caused by a resonance characteristic of a control object is decreased, and can be hardly formed as a model, the resonance model 43 is not necessarily considered.

A rigid-body model position "Pm32" may be expressed by the below-mentioned equation (1) by employing a rigid-body model position "Pmb" at a preceding sampling point, a rigid-velocity model velocity "Vmb" at the preceding sampling point, an input signal "Um" inputted to the model, and a time period "Ts":

$$Pm = Pmb + Ts \times Vmb + (1/2)Ts^2 \times Um \quad (1)$$

A rigid-body model velocity may be calculated as the following equation (2):

$$Vm = Vmb + Ts \times Um \quad (2)$$

In the case that the resonance model 43 is expressed by employing a pulse transfer function defined from an input signal up to a resonance model position, this resonance model 43 is assumed as such a discrete model that the below-mentioned formula (3) indicative of a vibration mode in a continuous time system is held by a zero-order hold at the sampling period Ts:

$$a/(S^2 + 2\zeta\omega nS + \omega n^2) \quad (3)$$

In the case that the delay model 44 is expressed by employing a pulse transfer function while the dead time owned by the control system is defined as "Td", this delay model 44 is assumed as such a model realized in a discrete time system after the below-mentioned transfer function (4) of a dead time element has been approximated to a rational function:

$$\exp(-TdS) \quad (4)$$

In the embodiment 1, the Padé linear approximation is employed as the method of approximating the pulse transfer function to the rational function.

If such an internal model is owned, then both a position and a velocity can be predicted from which both the dead time owned by the control system and the influence of the resonance characteristic have been removed.

Both the predicted rigid-body model position and the predicted rigid-body model velocity are used as an initial value of an waveform formula which is employed during decelerating operation.

A position control device 45 is constructed of a following compensating device used to realize desirable control performance. This position control device 45 captures a positional error 29 corresponding to a deviation between a model position 34 for a positional feedback purpose and the head position signal P, and then outputs a positional feedback input 30 used to compress this positional error 29.

Inputs to the rigid-body position model 41, the rigid-body velocity model 42, and the resonance model 43 are assumed as such a value obtained by subtracting the positional feedback input 30 form the velocity feedback input 31. An input to the delay model 44 is assumed as a summation between an output of the rigid-body position model 41 and the output of the resonance model 43.

In a seek operation having a uniform velocity mode in which acceleration becomes substantially zero between an accelerated velocity mode and a decelerated velocity mode, in such a case that a time instant at a decelerated velocity starting point is assumed as "T1" and another time instant of an median between the time instant "T1" and a time instant when the seek operation is ended is assumed as "T2", a time historical response of acceleration in a section defined from the time instant T1 to the time instant T2 may be approximately expressed by such a polynomial of time. This polynomial contains as an initial value, both an one-time integrated value of acceleration from the seek starting time up to the time instant T1, and also, a two-time integrated value of acceleration from the seek starting time up to the time instant T1.

In the accelerated velocity/uniform velocity mode, in such a case that an absolute value of the predicted velocity 28 becomes larger than, or equal to an absolute value of the target velocity 27, the value of the velocity feedback input 31 is set to "0", and the control mode is switched to the decelerated velocity mode.

In the case that the target velocity 27 is the set maximum velocity, when a deviation between the present head position P and the target track Ref becomes small than, or equal to a predetermined value, the control mode is switched to the decelerated velocity mode.

As a consequence, a target velocity generator 40 determines a switching condition from the accelerated velocity/uniform velocity mode to the decelerated velocity mode.

Next, a description is made of the decelerated velocity mode. In this embodiment 1, the decelerated velocity mode is assumed as such an operation mode defined from a commencement of a decelerating operation until a completion of a seek operation.

Figure 4:
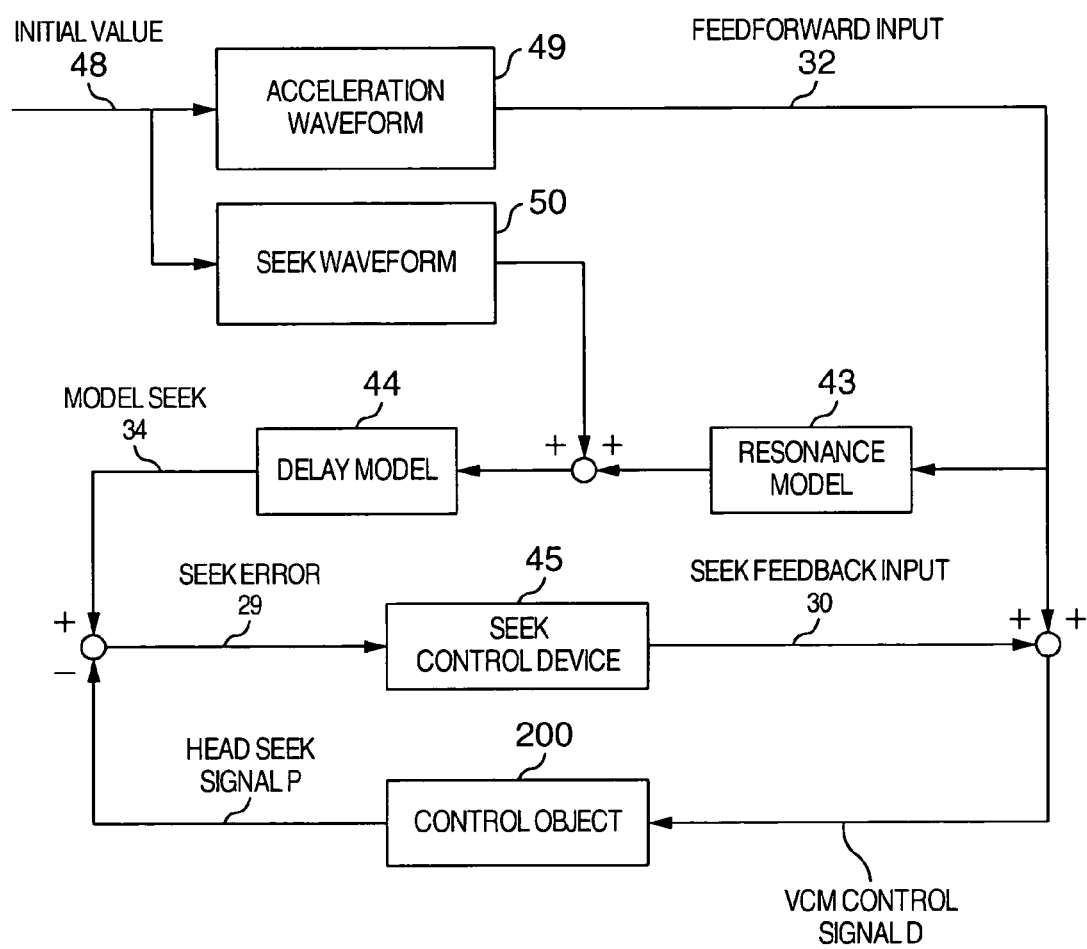
FIG. 4 is a block diagram for seek control system of the decelerated velocity mode.

FIG. 4 is a block diagram for schematically indicating an arrangement of a control system according to an embodiment 1 in such a case that the seek control system is the decelerated velocity mode.

It is now assumed that a position control device 45, a resonance model 43, and a delay model 44 are identical to those employed in the accelerated velocity/uniform velocity mode.

An input to the delay model 44 is a summation between an output of a position waveform "Pt" 50 and an output of the resonance model 43. An input to the position control device 45 corresponds to the positional error 29 equal to the deviation between the model position 34 for the positional feedback purpose and the head position signal P.

Both the acceleration waveform "Ut" 49 and the position waveform "Pt" 50 correspond to a function of time "t [s]" defined from the commencement of the decelerated velocity mode, and locuci thereof is determined based upon such initial values 48 made of an initial position x0 [m], an initial velocity v0 [m/s], and a target decelerated velocity time T [s].

The position waveform Pt may select a locus function, and the acceleration waveform Ut is such a function obtained by differentiating the position waveform Pt two times.

The locuci of both the position waveform Pt and the acceleration waveform Ut is determined in response to the initial values 48.

Among the initial values 48, the initial position x0 [m] is substituted by the rigid-body model position Pm when the decelerating operation is commenced. The initial velocity v0 [m/s] is substituted by the rigid-body model velocity Vm when the decelerating operation is commenced. The target decelerated velocity time T is set based upon the deviation between the head position P and the target track Ref.

An example of a designing method for designing both the target velocity generator 40 and the target decelerated velocity time "T" will now be explained.

First, both a maximum value of an absolute value of the acceleration waveform Ut and another maximum value of a differential value (jerk) of the acceleration waveform Ut when the decelerating operation is carried out are set. Under restriction condition of these maximum values, a combination between the initial position x0 and the initial velocity v0 is searched in such a manner that the target decelerated velocity time T becomes minimum time.

A searching range is assumed as such a range that the calculated initial velocity v0 becomes a maximum velocity which is allowed in the control system. As a result, a relationship among these values of x0, v0, T may be exclusively determined.

The target velocity generator 40 calculates "v0" which constitutes the target velocity in response to "x0" based upon the acquired relationship between x0 and v0. When a remaining distance is larger than the maximum value of x0, the maximum velocity is outputted as the target velocity. Similarly, the target time T is calculated based upon the relationship between x0 and T.

In the embodiment 1, the following case will now be explained. That is, while both a position sixth-order waveform "Pt" and an acceleration fourth-order waveform "Ut" are selected under such a condition that a position, a velocity, acceleration, and jerk become zero at a seek terminal, an absolute value of "Pt" is set to 1920 m/s$^2$ at maximum, and a differential value of "Ut" is set to 3,000,000 m/s$^3$ at maximum.

Figure 5A:
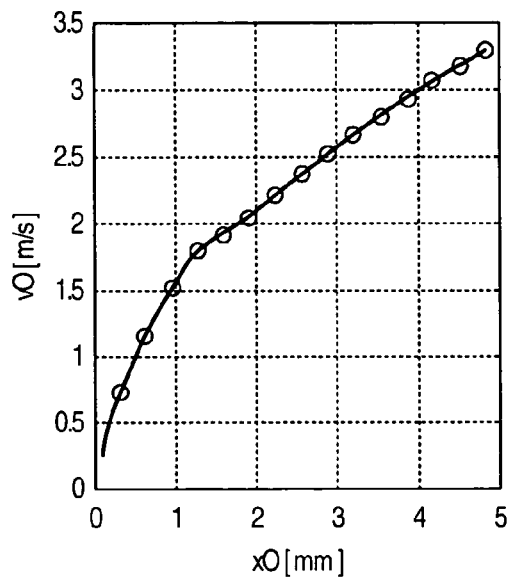
FIG. 5A is a diagram for indicating a relationship between "x0" and "v0"
Figure 5B:
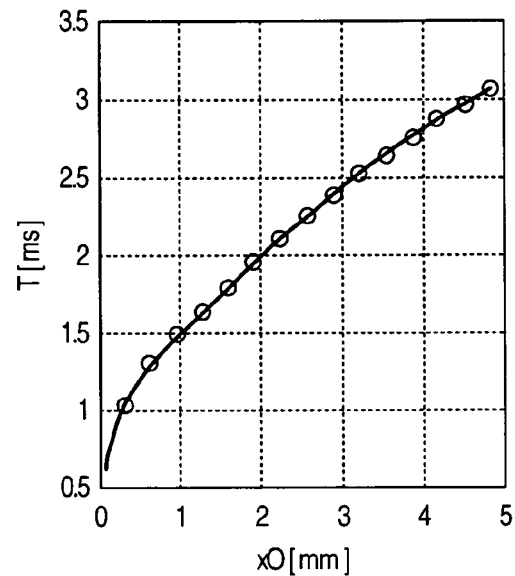
FIG. 5B is a diagram for representing a relationship between "x0" and "T."

FIG. 5A is a diagram for indicating a relationship between "x0" and "v0", and FIG. 5B is a diagram for representing a relationship between "x0" and "T."

Figure 6:
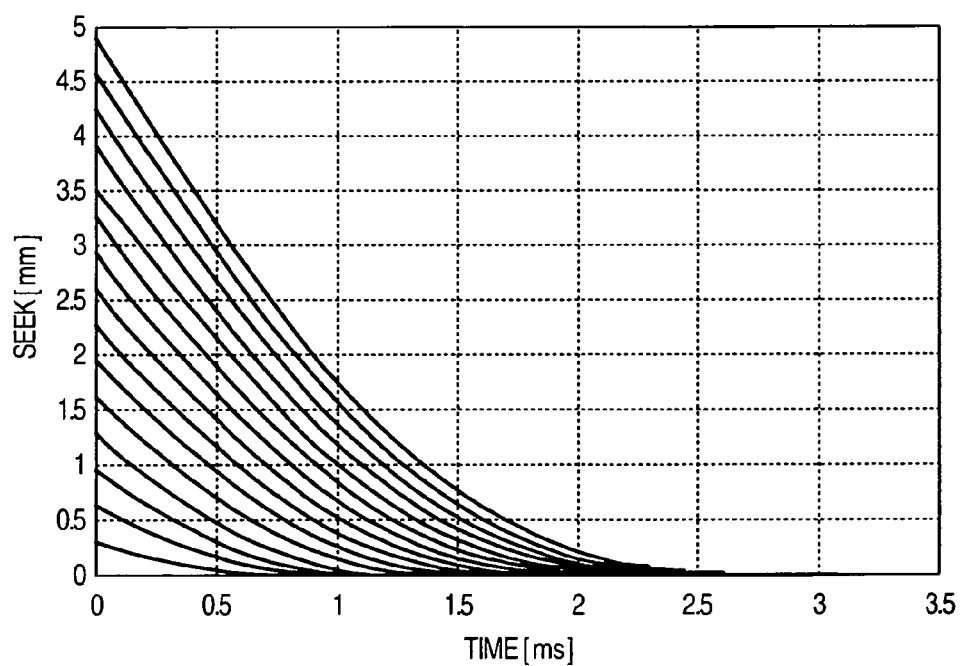
FIG. 6 is a diagram for indicating a time historical response of an output of a position waveform "Pt" in such a case that points indicated by symbol "o" in FIG. 5 are used as initial values.

FIG. 6 is a diagram for indicating a time historical response of an output of a position waveform "Pt" in such a case that points indicated by symbol "o" in FIG. 5A and FIG. 5B are used as initial values.

Figure 7:
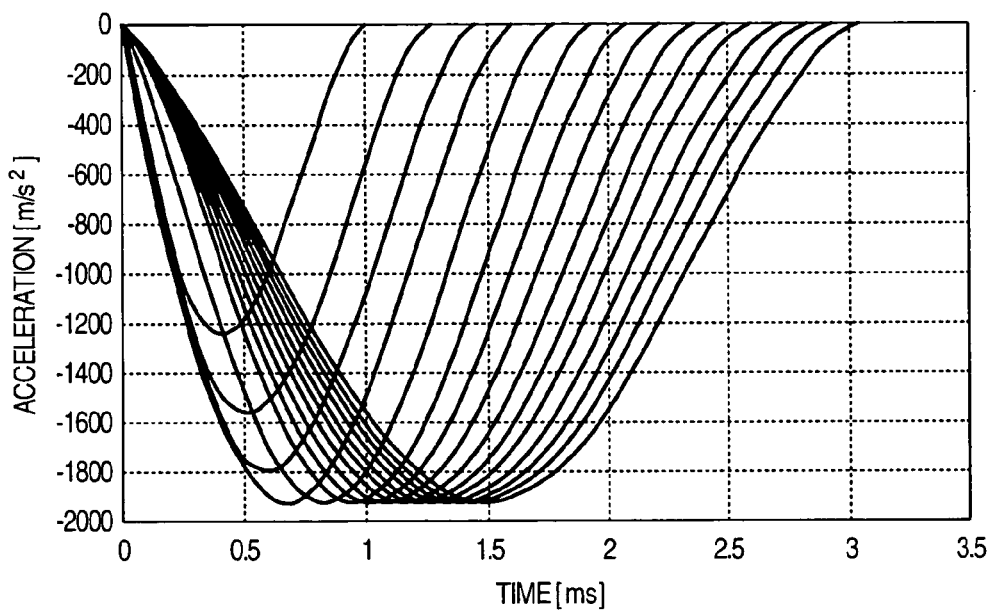
FIG. 7 is a diagram for indicating a time historical response of an output of an acceleration waveform "Ut" in such a case that points indicated by symbol "o" in FIG. 5 are used as initial values.

FIG. 7 is a diagram for indicating a time historical response of an output of an acceleration waveform "Ut" in such a case that points indicated by symbol "o" in FIG. 5A and FIG. 5B are used as initial values.

Figure 8:
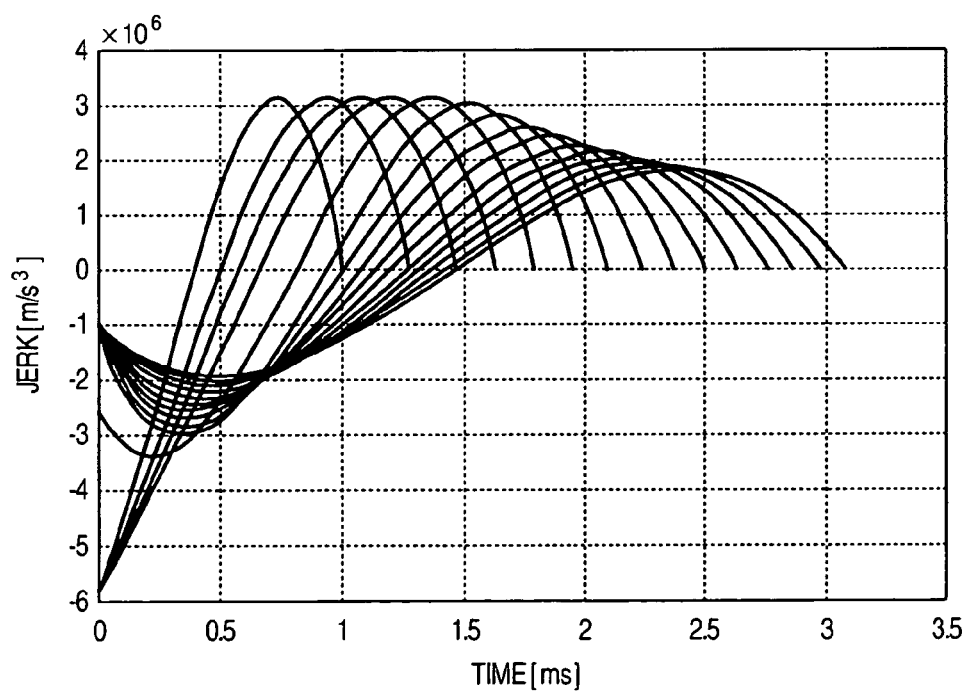
FIG. 8 is a diagram for indicating a time historical response of a differential value of the acceleration waveform "Ut" in such a case that points indicated by symbol "o" in FIG. 5 are used as initial values.

FIG. 8 is a diagram for indicating a time historical response of a differential value of the acceleration waveform "Ut" in such a case that points indicated by symbol "o" in FIG. 5 are used as initial values.

From these drawings, the following fact can be understood based upon the relationship among x0, v0, and T. That is, the maximum acceleration (absolute value) during the decelerating operation is suppressed lower than, or equal to 1920 m/s$^2$, and the maximum value of the differential values of the acceleration waveform Ut is suppressed smaller than, or equal to 3,000,000 m/s$^3$.

A simulation result of the seek control system in the case that the present invention is employed will now be described.

First, a consideration is made as to such a case that the target track "Ref" is selected to be a relatively near track, namely 2.32 mm.

Figure 9:
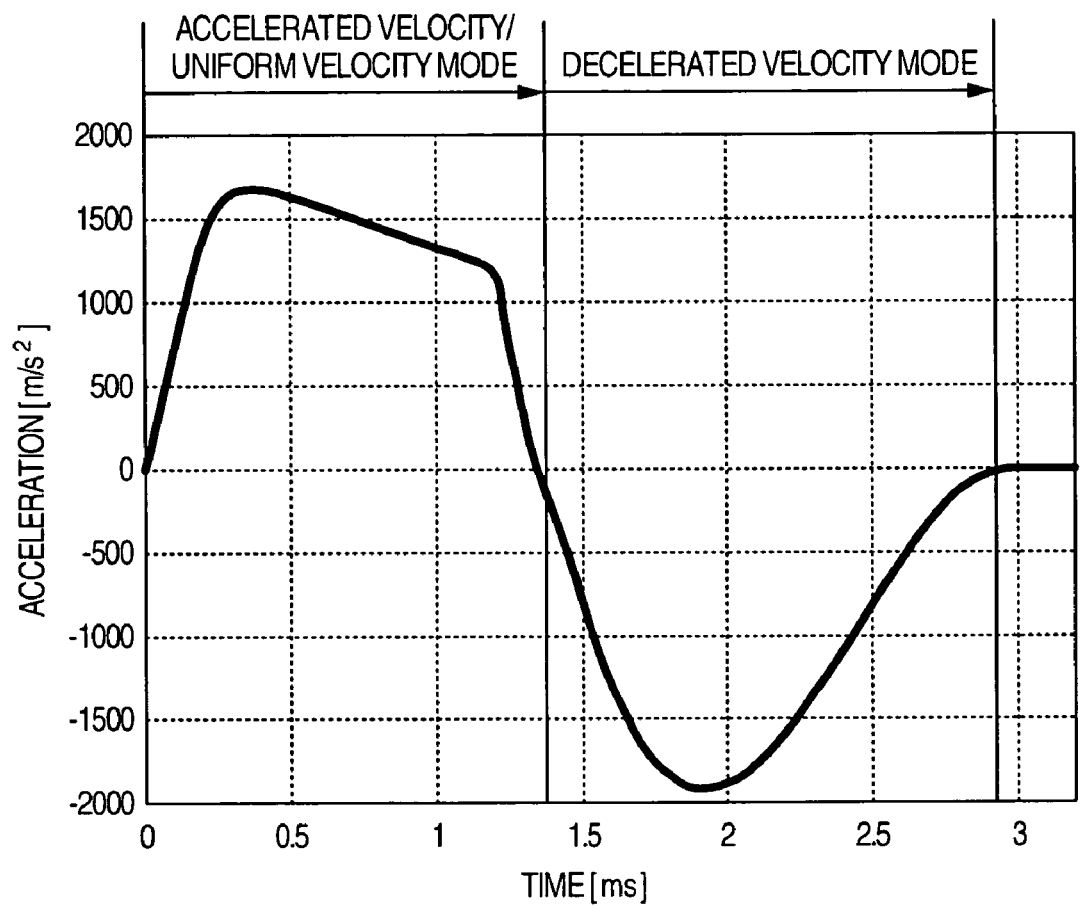
FIG. 9 is a time chart for representing a time historical response of acceleration produced in the control object in such a case that the target track "Ref" is defined as 2.32 mm in the hard disk drives according to the embodiment 1 of the present invention.

FIG. 9 is a time chart for representing a time historical response of acceleration which is produced on a control object. In this flow chart, a time period from the commencement of the seek control operation until the acceleration firstly becomes zero corresponds to the accelerated velocity/uniform velocity mode, and a time period after the first-mentioned time period corresponds to the decelerated velocity mode.

An acceleration waveform during the decelerated velocity mode owns a smooth locus, and a maximum value (absolute value) thereof becomes 1920 m/s$^2$ which is equal to the designed value.

Figure 10:
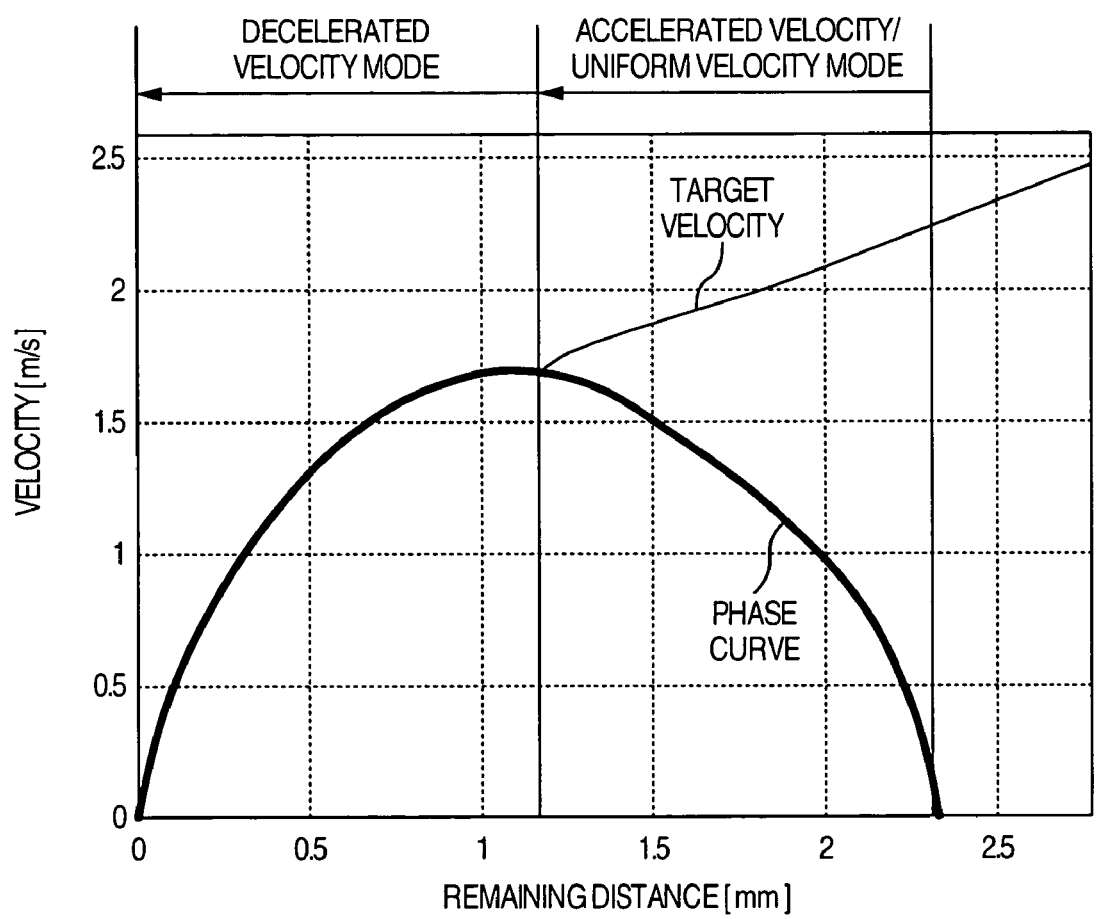
FIG. 10 is a diagram for showing a phase plane locus by a wide line and a target velocity by a narrow line in the case that while the target track "Ref" is defined as 2.32 mm in the hard disk drives of the embodiment 1 of the present invention, an abscissa indicates a head position and an ordinate represents a head velocity.

FIG. 10 is a diagram for showing a phase plane locus by a wide line and a target velocity by a narrow line in the case that an abscissa indicates a head position and an ordinate represents a head velocity. In this drawing, a distance defined until the phase plane locus intersects the target velocity corresponds to the accelerated velocity/uniform velocity mode, and a distance after the phase plane locus intersects the target velocity corresponds to the decelerated velocity mode.

Figure 11:
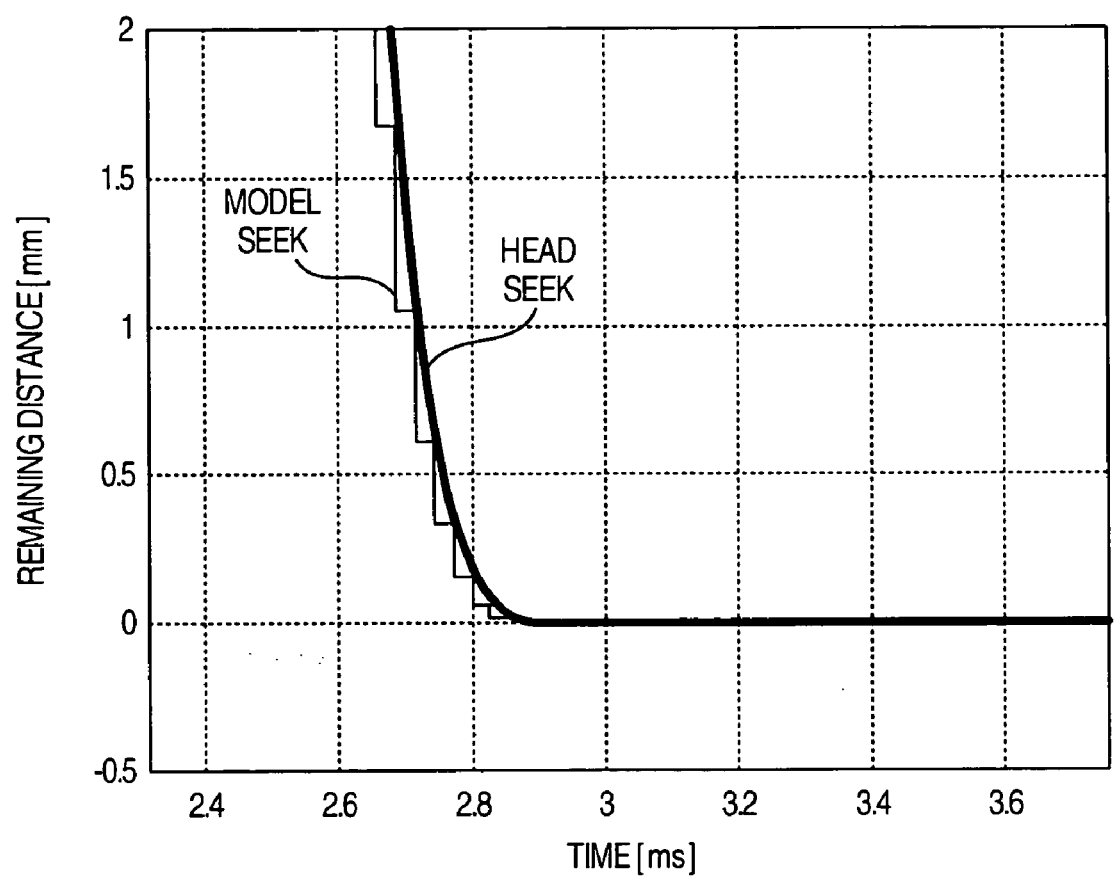
FIG. 11 is a time chart for representing a time historical response of a head position in the vicinity of a target track in such a case that the target track "Ref" is defined as 2.32 mm in the hard disk drives according to the embodiment 1 of the present invention.

FIG. 11 is a time chart for showing a time historical response of a head position located in the vicinity of a target track.

In the seek control system according to the present invention, the actual head position can follow in higher precision with respect to the target model position, and there is substantially no residual vibration.

Next, a consideration is made of such a case that the target track "Ref" is selected to be a relatively far track, namely 18.59 mm.

Figure 12:
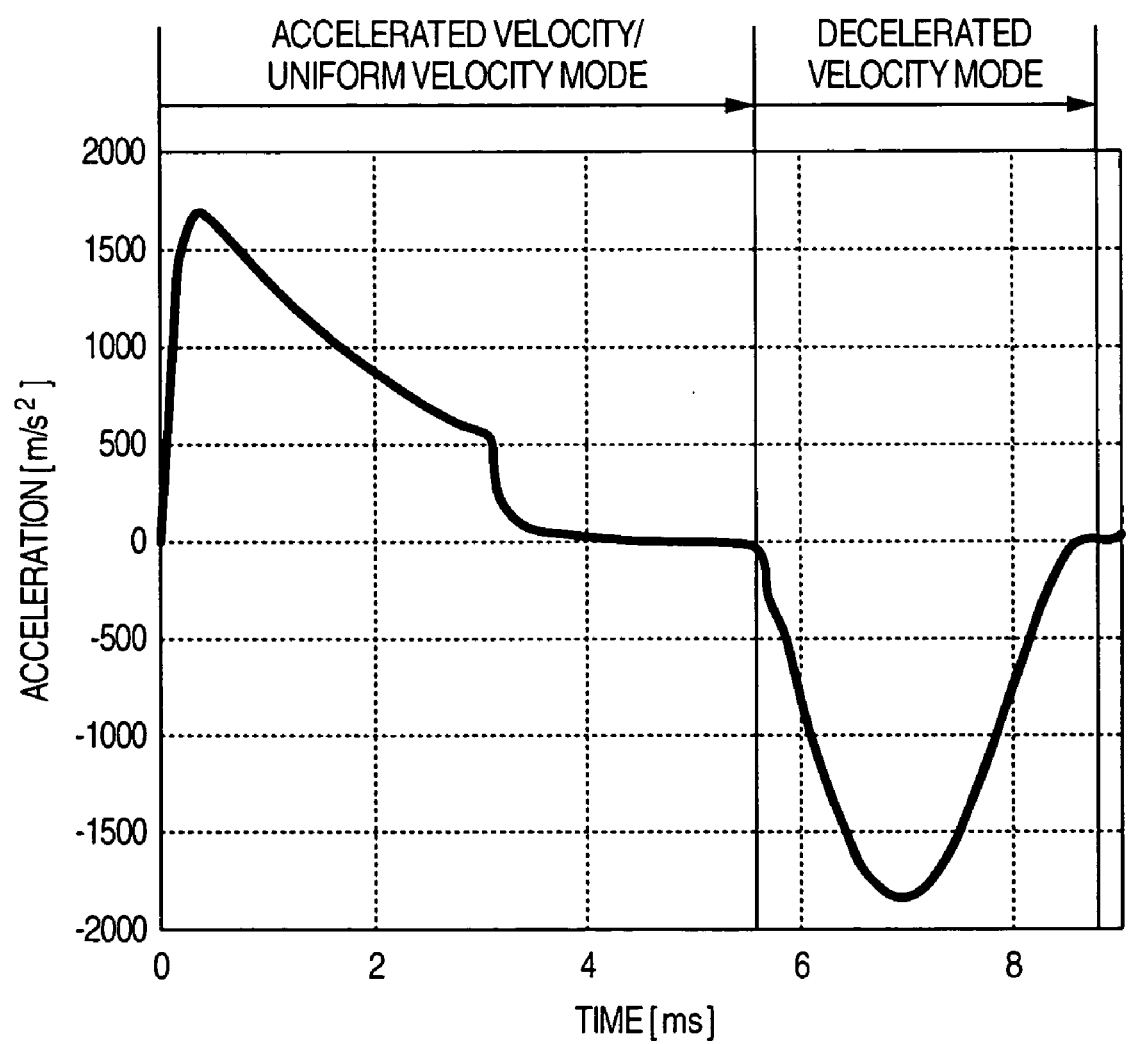
FIG. 12 is a time chart for representing a time historical response of acceleration produced in the control object in such a case that the target track "Ref" is defined as 18.59 mm in the hard disk drives according to the embodiment 1 of the present invention.

FIG. 12 is a time chart for showing a time historical response of acceleration which is produced on a control object.

An acceleration waveform during the decelerated velocity mode owns a smooth locus, and a maximum value (absolute value) thereof becomes 1920 m/s$^2$ which is equal to the designed value.

Figure 13:
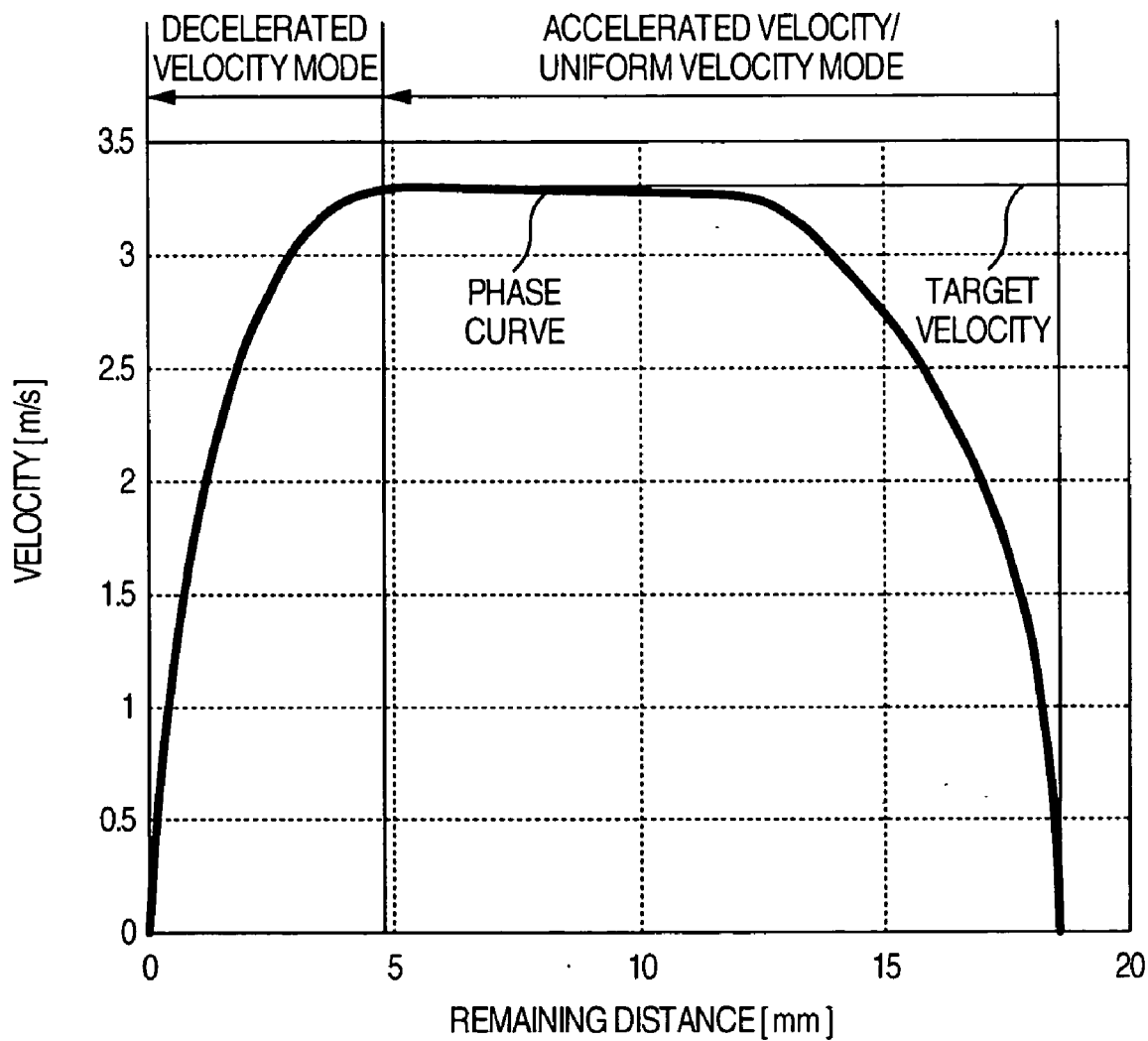
FIG. 13 is a diagram for showing a phase plane locus by a wide line and a target velocity by a narrow line in the case that while the target track "Ref" is defined as 18.59 mm in the hard disk drives of the embodiment 1 of the present invention, an abscissa indicates a head position and an ordinate represents a head velocity.

FIG. 13 is a diagram for showing a phase plane locus by a wide line and a target velocity by a narrow line in the case that an abscissa indicates a head position and an ordinate represents a head velocity.

In this case, since the head velocity is reached to the maximum velocity which has been set in the accelerated velocity/uniform velocity mode, such a condition that the remaining distance becomes shorter than the maximum value (namely, 4.85 mm) of x0 corresponds to the accelerated velocity/uniform velocity mode.

Figure 14:
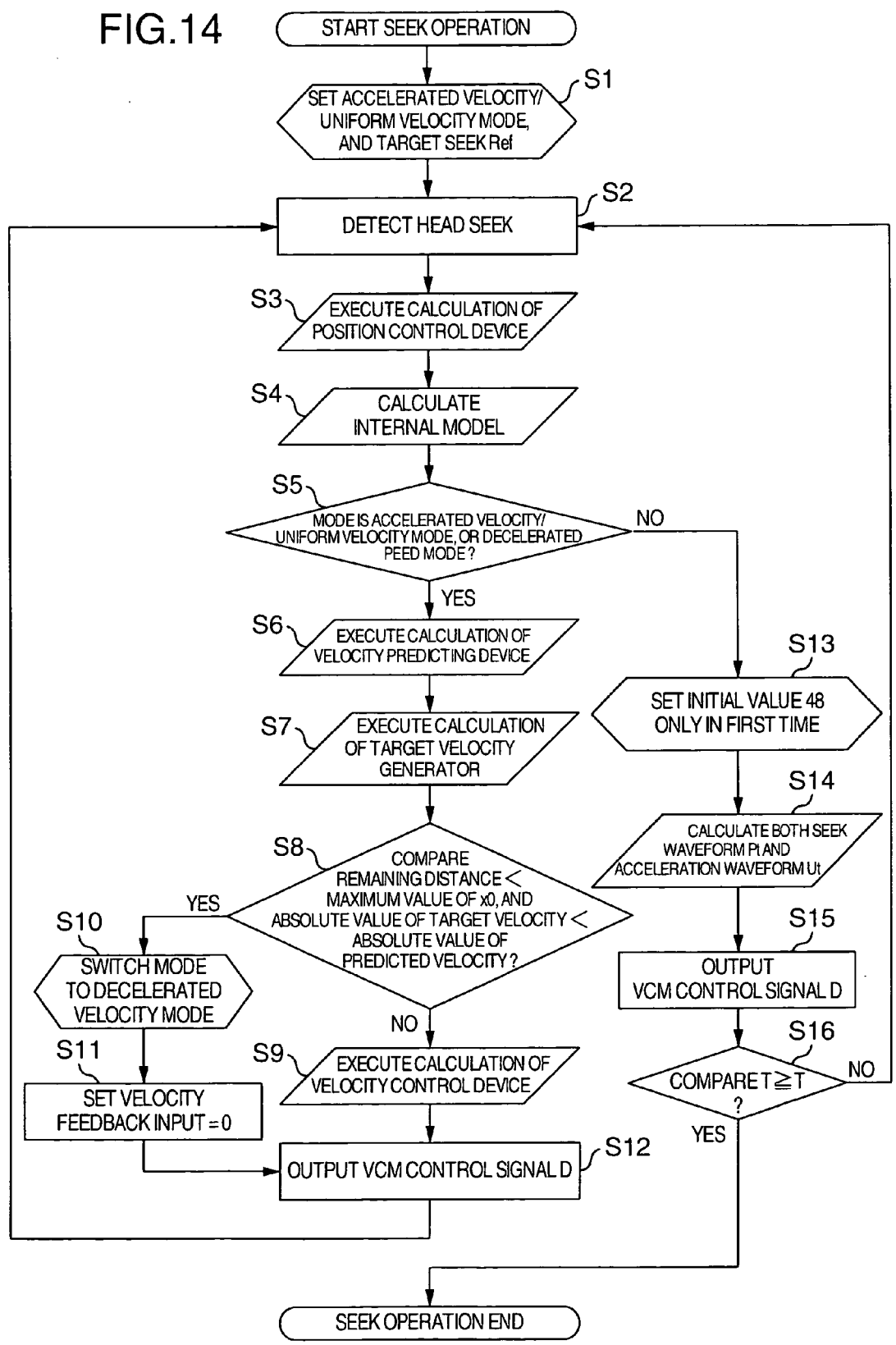
FIG. 14 is a flow chart for describing a sequential control operation of the hard disk drives according to the embodiment 1 of the preset invention.

FIG. 14 is a flow chart for describing a sequential control operation of the embodiment 1 of the hard disk drives according to the present invention.

In this flow chart, when a seek command is firstly issued, a target position "Ref" corresponding to such a target track where data is read/written is set, and a mode is set to the accelerated velocity/uniform velocity mode (step S1).

Next, a head position is detected (step S2), a calculation of the position control device 41 is executed (step S3), and a calculation of an internal model is executed (step S4).

It should be understood that the calculation methods in the accelerated velocity/uniform velocity mode and the decelerated velocity mode are changed from each other in the step S3 and the step S4.

In this case, a judgement is made as to whether the velocity mode corresponds to the accelerated velocity/uniform velocity mode, or the decelerated velocity mode (step S5). When the velocity mode corresponds to the accelerated velocity/uniform velocity mode, a calculation of a predicted velocity is executed (step S6), and then, a calculation of the target velocity generator 40 is carried out (step 7).

Thereafter, a magnitude of a remaining distance is compared with the maximum value of x0, and an absolute value of a target velocity is compared with an absolute value of the predicted velocity (step S8).

In such a case that the remaining distance is smaller than the maximum value of x0, and also, the absolute value of the target velocity is smaller than, or equal to the absolute value of the predicted velocity, the velocity mode is switched to the decelerated velocity mode (step S10), the velocity feedforward input is set to be equal to "0" (step S11), a VCM control signal "D" is outputted (step S12), and then, the process operation is returned to the previous step S2.

In any case other than the above-described case, a calculation of the velocity control device 46 is executed (step S9), and after the VCM control signal D is outputted (step S12), the process operation is returned to the step S2.

In the step S5, when the velocity mode corresponds to the decelerated velocity mode, the initial value 48 is set in the first time of the decelerated velocity mode (step S13).

Thereafter, both a position waveform "Pt" and an acceleration waveform "Ut" are calculated (step S14), and then, the VCM control signal D is outputted (step S15).

While a time "t" defined from the commencement of the decelerated velocity mode is compared with the target decelerated velocity time "T" (step S16), if t<T, then the process operation is returned to the previous step S2, whereas if t≧T, then the seek operation is accomplished.

Embodiment Mode 2

It should be understood that a system structure of a head positioning control system according to an embodiment mode 2 of the present invention, a basic relationship between a seek control means and a control object in a hard disk drives of this embodiment 2, and also, a control system in which a control amount of an accelerated velocity/uniform velocity mode of the hard disk drives of this embodiment 2 are identical to those of the embodiment 1 shown in FIG. 1, FIG. 2, FIG. 3. As a result, explanations thereof are omitted.

In the embodiment 1, the control amount of the decelerated velocity mode has been employed as the head position, whereas in the embodiment 2, a control amount of a decelerated velocity mode is used as a head velocity.

Figure 15:
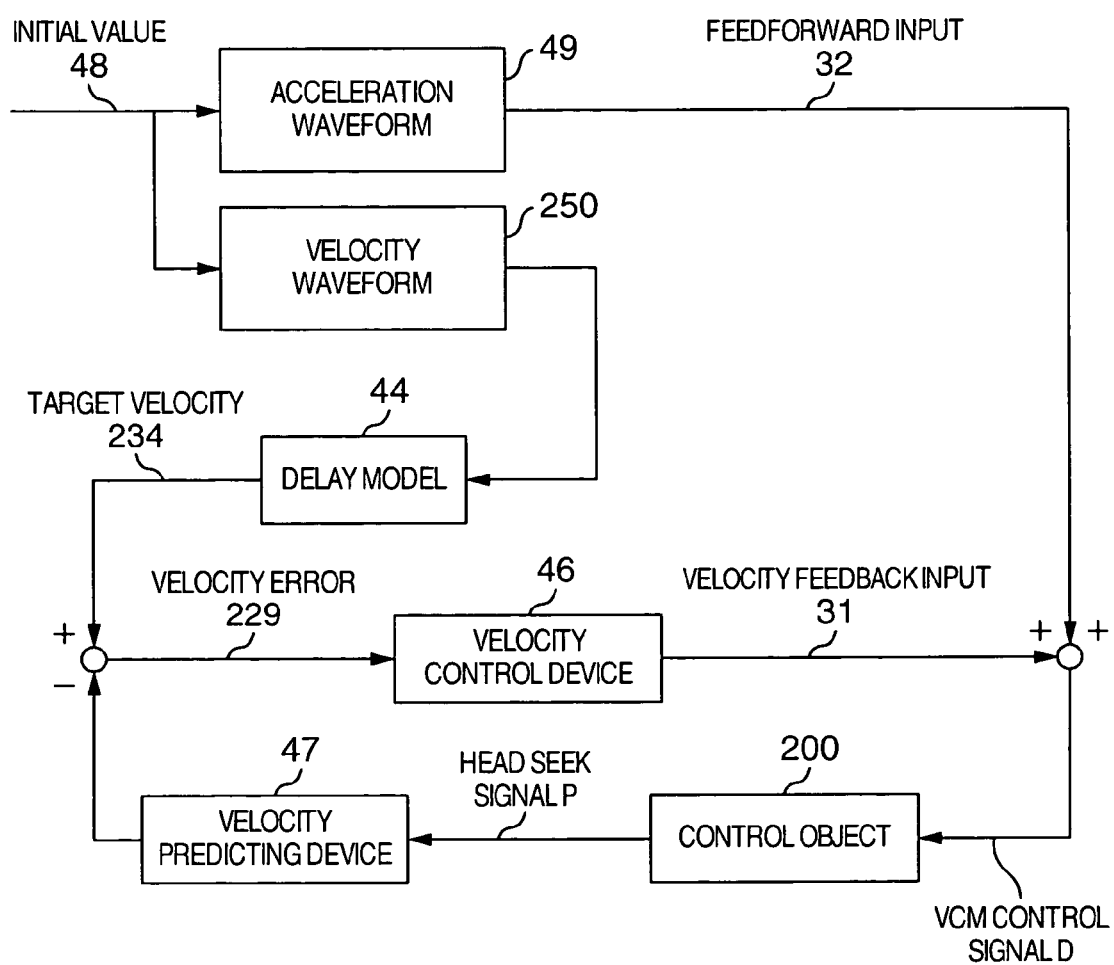
FIG. 15 is a block diagram for representing an arrangement of a control system according to an embodiment 2, in which a control amount of a decelerated velocity mode of the hard disk drives according to the present invention is used as a velocity.

FIG. 15 is a block diagram for indicating an arrangement of a control system according to the embodiment 2 in the case that the control amount of the decelerated velocity mode of the hard disk drives of the present invention is employed as the head velocity.

The control system of this embodiment 2 is arranged by an acceleration waveform 49, a velocity waveform 250, a delay model 44, a velocity predicting device 47, an adding means, a velocity control device 46, and also, an adding means. The acceleration waveform 49 outputs a feedforward input 32 based upon an initial value when a velocity mode is switched from an accelerated velocity mode. The velocity waveform 250 outputs a velocity waveform based upon the above-described initial value. The delay model 44 captures the output of the velocity waveform 250. The velocity predicting device 47 predicts a velocity based upon a head position signal P. The adding means calculates a velocity error 229 based upon a deviation between the output of the delay model 44 and the output of the velocity predicting device 47. The velocity control device 46 outputs a velocity feedback input 31 based upon the velocity error 229. The adding means adds the feedforward input 32 to the velocity feedback input 31 so as to obtain a VCM control signal.

With respect to an waveform which is calculated in the decelerated velocity mode, such a velocity waveform by using fifth degree polynominal experiment is selected as a velocity waveform "Vt", and an acceleration waveform by using fourth degree polynominal experiment is selected as an acceleration waveform "Ut", in which a position, a velocity, acceleration, and jerk become zero in a seek terminal.

Similar to the embodiment 1, in the case that an absolute value of the acceleration waveform Ut is set to 1920 m/s$^2$ at maximum, and also, a differential value of the acceleration waveform Ut is set to 3,000,000 m/s$^3$, both a relative curve between x0 and v0, and another relative curve between x0 and T are identical to those of the embodiment 1.

A feedback compensating device constitutes a velocity control device. An input of this velocity control device is a difference between a velocity predicted value and a target velocity made by involving a dead time characteristic in the output of the velocity waveform V5.

The VCM control signal D is obtained from a summation between the feedforward input and the velocity feedback input.

In this embodiment 1 and 2, the input into the internal model in the accelerated velocity/uniform velocity mode is obtained from the difference between the velocity feedback input 31 and the position feedback input 30. Alternatively, such a predicted value of acceleration based upon the VCM current value which has been detected instead of the velocity feedback input may be employed as this input into the internal model. As a result, a dissociation between the internal model and the actual head position in connection with the voltage saturation may be suppressed.

In the embodiment 1 and 2, the internal model has been used in order to predict the initial values "x0" and "v0." Alternatively, such a prediction system from both the head position and the VCM current value may be applied in order to predict the initial values "x0" and "v0" without using the internal model.

The embodiment 1 and 2 employ the control system without using the settling mode. Alternatively, the mode may be switched to this settling mode at such a time instant when the head position is approached to the target track. In this case, such a range that the decelerating operation has been commenced and then the mode is switched to settling mode may constitute the application range of the decelerated velocity mode.

In the embodiment 1 and 2, the resonance model has been expressed by the second-order pulse transfer function. Alternatively, a resonance model of a constant gain may be expressed.

In accordance with the present invention, such a hard disk drives equipped with the seek control means can be obtained, while this seek control means contains the seek control system in which the vibrations to be generated are small, and also, the seek control means can manage the VCM voltage saturation and the uniform velocity mode during the seek operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A hard disk drives comprising: seek control means for moving a magnetic head which reads/writes information of a magnetic recording medium to a target position, wherein:
    said seek control means corresponds to a velocity control system which produces a target value based upon a target track, a present position, and a remaining distance from a commencement of a seek operation up to a time instant when a sign of an operating amount is changed; and said seek control means corresponds to a Two Degree of Freedom control system which sets an waveform by a function of time as a target value after the time instant when the sign of the operating amount is changed.

2. A hard disk drives as claimed in claim 1 wherein:
    the seek operation of said magnetic head includes an accelerated velocity mode, a uniform velocity mode in which acceleration becomes substantially zero, and a decelerated velocity mode; and
    a time historical response of acceleration during decelerating operation within at least two move distances is expressed by a polynomial of time.

3. A hard disk drives as claimed in claim 2 wherein:
    a control amount of the decelerated velocity mode corresponds to a head position.

4. A hard disk drives as claimed in claim 2 wherein:
    a control amount of the decelerated velocity mode corresponds to a head velocity.

5. A hard disk drives as claimed in claim 1 wherein:
    the seek operation of said magnetic head includes an accelerated velocity mode, a uniform velocity mode in which acceleration becomes substantially zero, and a decelerated velocity mode; and
    when a time instant of a point where the decelerating operation is commenced is assumed as "T1" and a time instant of an median between said time instant "T1" and an end of the seek operation is assumed as "T2", a time historical response of acceleration within a section defined from the time instant "T1" to the time instant "T2" is approximately expressed by a polynomial of time which contains both an one-time integrated value of acceleration from the commencement of the seek operation up to the time instant "T1", and a two-time integrated value of the acceleration from the commencement of the seek operation up to the time instant "T1" as an initial value.

6. A hard disk drives comprising: seek control means for moving a magnetic head which reads/writes information of a magnetic recording medium to a target position, wherein:
    said seek control means is comprised of: a velocity control system in which an operating amount is calculated based upon a deviation between a target track and a present position of said magnetic head; a Two Degree of Freedom control system in which an operating amount is calculated based upon time; and switching means for switching said velocity control system into said Two Degree of Freedom control system at a time instant when a sign of the operating amount is changed.

7. A hard disk drives comprising: seek control means for moving a magnetic head which reads/writes information of a magnetic recording medium to a target position, wherein:

said seek control means is comprised of: a velocity control system in which an operating amount is calculated based upon a deviation between a target track and a present position of said magnetic head; a Two Degree of Freedom control system in which an operating amount is calculated based upon time; and switching means for switching said velocity control system into said Two Degree of Freedom control system at a time instant when a sign of the operating amount becomes zero.

8. A hard disk drives comprising: a magnetic recording medium; a magnetic head for reading/writing information of said magnetic recording medium; a voice coil motor VCM for driving said magnetic head; and seek control means for moving said magnetic head to a target position; wherein:

a seek operation of said magnetic head includes an accelerated velocity mode and a decelerated velocity mode;

said seek control means corresponds to a velocity feedback control system in the accelerated velocity mode, and also, corresponds to a Two Degree of Freedom control system for setting a magnetic head position by a function of time as a target value in the decelerated velocity mode;

said velocity feedback control system is comprised of: a target velocity generator for setting a target velocity based upon a deviation between a present head position "P" and a target track "Ref"; a velocity predicting device for forming a predicted velocity based upon a head position signal "P"; a velocity control device for acquiring a VCM control signal based upon a deviation between said target velocity and said predicted velocity; a position control device for capturing a positional error equal to a deviation between a model position for a positional feedback purpose and the head position signal "P", and for outputting a positional feedback input used to compress said positional error; a rigid-body position model, a rigid-body velocity model, and a resonance model of said magnetic head, which capture a deviation between said VCM control signal and said positional feedback input; and also, a delay model for capturing a summation between an output of said rigid-body position model and an output of said resonance model, and for outputting said model position for positional feedback purpose; and said Two Degree of Freedom control system is comprised of: an acceleration waveform for outputting a feedforward input based upon an initial value when the mode is switched from the accelerated velocity mode; velocity waveform for outputting a target value based upon said initial value; a resonance model for capturing said feedforward input; a delay model for capturing a summation between an output of a position waveform "Pt" and an output of the resonance model; a position control device for capturing a positional error equal to a deviation between an output of the delay model and a head position signal "P"; and adding means for setting a summation between said feedforward input and an output of said position control device as the VCM control signal.

9. A hard disk drives as claimed in claim 8 wherein:

the seek operation of said magnetic head includes a uniform velocity mode in which acceleration becomes substantially zero between said accelerated velocity mode and said decelerated velocity mode; and a velocity control system same as said accelerated velocity mode is employed during said uniform velocity mode.

10. A hard disk drives comprising: a magnetic recording medium; a magnetic head for reading/writing information of said magnetic recording medium; and seek control means for moving said magnetic head to a target position; wherein:

a seek operation of said magnetic head includes an accelerated velocity mode and a decelerated velocity mode;

said seek control means corresponds to a velocity feedback control system in the accelerated velocity mode, and also, corresponds to a Two Degree of Freedom control system for setting a magnetic head velocity as a target value in the decelerated velocity mode;

said velocity feedback control system is comprised of: a target velocity generator for setting a target velocity based upon a deviation between a present head position "P" and a target track "Ref"; a velocity predicting device for forming a predicted velocity based upon a head position signal "P"; a velocity control device for acquiring a VCM control signal based upon a deviation between said target velocity and said predicted velocity; a position control device for capturing a positional error equal to a deviation between a model position for a positional feedback purpose and the head position signal "P", and for outputting a positional feedback input used to compress said positional error; a rigid-body position model, a rigid-body velocity model, and a resonance model of said magnetic head, which capture a deviation between said VCM control signal and said positional feedback input; and also, a delay model for capturing a summation between an output of said rigid-body position model and an output of said resonance model, and for outputting said model position for positional feedback purpose; and said Two Degree of Freedom control system is comprised of: an acceleration waveform for outputting a feedforward input based upon an initial value when the mode is switched from the accelerated velocity mode; a velocity waveform for outputting a target value based upon said initial value; a delay model for capturing an output of said velocity waveform; a velocity predicting device for predicting a velocity based upon a head position signal "P"; adding means for calculating a velocity error based upon a deviation between an output of said delay model and an output of said velocity predicting device; a velocity control device for outputting a velocity feedback input based upon the velocity error; and adding means for adding said feedforward input to said velocity feedback input so as to obtain the VCM control signal.

* * * * *